(12) United States Patent
Lee et al.

(10) Patent No.: US 7,915,353 B2
(45) Date of Patent: Mar. 29, 2011

(54) SILICA NANOCOMPOSITE, METHOD OF PREPARING THE SILICA NANOCOMPOSITE, COMPOSITE FOAM AND METHOD OF PREPARING THE COMPOSITE FOAM

(75) Inventors: Jin Gyu Lee, Seoul (KR); Myung Dong Cho, Hwaseong-si (KR); Sang Hoon Joo, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 424 days.

(21) Appl. No.: 12/025,353

(22) Filed: Feb. 4, 2008

(65) Prior Publication Data

US 2008/0188581 A1 Aug. 7, 2008

(30) Foreign Application Priority Data

Feb. 2, 2007 (KR) .................. 10-2007-0011268
Dec. 11, 2007 (KR) .................. 10-2007-0128270

(51) Int. Cl.
*C08G 77/04* (2006.01)
(52) U.S. Cl. ........................... 525/477; 523/201
(58) Field of Classification Search .................. 525/477; 523/201
See application file for complete search history.

(56) References Cited

U.S. PATENT DOCUMENTS 2,843,555 A * 7/1958 Berridge .................. 528/39
* cited by examiner

*Primary Examiner* — Kuo-Liang Peng
(74) *Attorney, Agent, or Firm* — Cantor Colburn LLP (57) ABSTRACT

Provided is a silica nanocomposite including silica and a siloxane-based polymer covalently bonded to the silica.

9 Claims, 6 Drawing Sheets

SILICA NANOCOMPOSITE, METHOD OF PREPARING THE SILICA NANOCOMPOSITE, COMPOSITE FOAM AND METHOD OF PREPARING THE COMPOSITE FOAM

This application claims the benefit of Korean Patent Application Nos. 10-2007-0011268, filed on Feb. 2, 2007, and 10-2007-0128270, filed on Dec. 11, 2007, in the Korean Intellectual Property Office, the disclosures of which are incorporated herein in their entirety by reference.

BACKGROUND OF THE INVENTION

1. Field of the Invention

The present invention relates to a silica nanocomposite and a composite foam, methods of preparing the silica nanocomposite and the composite foam.

2. Description of the Related Art

Aerogels are ultrafine porous low density materials. Aerogels have been used in various applications including catalyst carriers, insulating materials, noise shielding materials, and particle accelerators. Silica aerogels are inorganic insulating materials and show thermal insulating effects even at elevated temperatures. In general, silica aerogels prepared using low-temperature supercritical drying have a hydrophilic surface. The use of silica aerogels as thermal insulating materials results in poor insulation because of the adsorption of water molecules to the hydrophilic surface. Therefore, a separate surface treatment process is used to make the surface of silica aerogels hydrophobic. An example of such a silica aerogel is disclosed in U.S. Pat. No. 6,475,561.

In general, a silica aerogel is prepared using a high-temperature and high-pressure supercritical drying method. The silica aerogel obtained using such supercritical drying method is expensive and brittle.

SUMMARY OF THE INVENTION

Disclosed herein is a silica nanocomposite having a siloxane-based polymer covalently bonded to silica.

Disclosed herein too is a method of preparing a silica nanocomposite, the method including: hydrolyzing a reaction solution comprising a siloxane-based polymer and at least one kind of a silica precursor selected from an alkoxy group-containing silica precursor and an amine group-containing silica precursor to prepare a wet gel; and drying the wet gel to prepare a silica nanocomposite.

Disclosed herein too is a monolithic molded article prepared using the silica nanocomposite.

Disclosed herein too is a composite foam including the silica nanocomposite and a blown plastic foam.

Disclosed herein too is a method of preparing a composite foam, the method including: hydrolyzing a reaction solution including at least one kind of a silica precursor selected from an alkoxy group-containing silica precursor and an amine group-containing silica precursor and a siloxane-based polymer to prepare a wet gel; drying the wet gel in supercritical conditions to obtain a silica aerogel; and reacting a mixture solution comprising the silica aerogel, an isocyanate group-containing monomer, and a polyol premix to obtain a composite foam.

The present invention also provides a composite heat insulation material including the composite foam.

BRIEF DESCRIPTION OF THE DRAWINGS

The above and other features and advantages will become more apparent by describing in detail exemplary embodiments thereof with reference to the attached drawings in which.

DETAILED DESCRIPTION OF THE INVENTION

The invention will now be described more fully with reference to the accompanying drawings, in which exemplary embodiments of the invention are shown.

The silica nanocomposite includes silica and a siloxane-based polymer covalently bonded to the silica.

The silica nanocomposite has a sufficient mechanical flexibility due to the siloxane-based polymer covalently bonded to the silica, and thus, it can endure external impacts. Specifically, the siloxane-based polymer can absorb external impacts by acting as a spring in the silica nanocomposite.

In another embodiment, the siloxane-based polymer covalently bonded to the silica can include a repeating unit represented by Formula 1:

<Formula 1> where $R_1$ and $R_2$ are each independently a $C_{1-5}$ alkyl group or a $C_{6-10}$ aryl group, and k is an integer from 2 to 1000; preferably, $R_1$ and $R_2$ is each independently a $C_{1-5}$ alkyl or a phenyl group; more preferably, $R_1$ and $R_2$ is each independently a methyl group or an ethyl group.

In another embodiment, the silica can include one or more repeating unit selected from the repeating units represented by Formulae 2-4:

$$—[SiO_2—]_a—$$ <Formula 2>

$$—[Si(R^3)O_{3/2}—]_b—$$ <Formula 3>

$$—[Si((CH_2)_lNH_2)O_{3/2}—]_c—$$ <Formula 4> where $R^3$ is a $C_{1-10}$ alkyl group or a $C_{6-10}$ aryl group; a, b and c are each independently an integer from 1 to 100; and l is an integer from 1 to 5. Preferably, $R^3$ can be a $C_{1-5}$ alkyl group or a phenyl group, and more preferably, $R^3$ can be a methyl group or an ethyl group.

The repeating unit represented by Formula 2 may have a hydroxyl group and/or an amine group at its terminals. The repeating unit represented by Formula 3 and/or 4 may have a hydroxyl group at its terminals.

In another embodiment, the silica nanocomposite can be additionally coated with a polyurethane-based and/or polyurea-based organic coating layer. The polyurethane-based organic coating layer can be formed by, for example, reacting a diisocyanate-based compound with a hydroxyl group present in the silica surface. The polyurea-based organic coating layer can be formed by, for example, reacting the diisocyanate-based compound with an amine group present in the silica surface. The polyurethane-based and/or polyurea-based organic coating layers render the silica surface hydrophobic. Therefore, water cannot adsorb onto the hydrophobic surface of silica and thus, the heat insulation performance of the silica nanocomposite is not degraded.

In another embodiment, the silica nanocomposite can be a silica xerogel or silica aerogel according to a drying method. When the silica nanocomposite is dried at room temperature, the silica nanocomposite becomes a silica xerogel. On the other hand, when the silica nanocomposite is dried in supercritical conditions, the silica nanocomposite becomes a silica aerogel.

Unlike a conventional silica xerogel having almost no pores because pores are collapsed in a room-temperature drying process, the silica xerogel coated with the polyurethane disclosed herein has pores because the siloxane-based polymer acting as a supporter prevents the collapse of pores. The silica xerogel is a porous xerogel having a large surface area per unit mass. Specifically, the silica xerogel according to an embodiment of the present invention has a surface area per unit mass of 30 m²/g or more, preferably, from 30 to 1000 m²/g.

The silica aerogel disclosed herein has a surface area per unit mass similar to a conventional silica aerogel. Specifically, the silica aerogel disclosed herein has a surface area per unit mass of 170 m²/g or more, preferably, from 170 to 2000 m²/g.

A method of preparing a silica nanocomposite, the method including: hydrolyzing a reaction solution comprising a siloxane-based polymer with a silica precursor selected from an alkoxy group-containing silica precursor and an amine group-containing silica precursor to prepare a wet gel; and drying the wet gel to prepare a silica nanocomposite.

In another embodiment, the siloxane-based polymer can be the compound represented by Formula 5:

$$HO—[Si(R_1)(R_2)O—]_k—H$$ <Formula 5> where $R_1$ and $R_2$ are each independently a $C_{1-10}$ alkyl group or a $C_{6-10}$ aryl group, and k is an integer from 2 to 1000; preferably, $R_1$ and $R_2$ is each independently a $C_{1-5}$ alkyl or a phenyl group; more preferably, $R_1$ and $R_2$ is each independently a methyl group or an ethyl group.

In another embodiment, the amount of the siloxane-based polymer may be about 1 to about 50 wt. %, preferably, in an amount of about 1 to about 30 wt. %, based on the total weight of the alkoxy group-containing silica precursor, the amine group-containing silica precursor and the siloxane-based polymer.

In another embodiment, the alkoxy group-containing silica precursor can include an alkoxy silane compound represented by Formula 6, and the amine group-containing silica precursor can include an amine group-containing alkoxy silane compound represented by Formula 7:

$$SiR^3{}_m(OR^3)_{4-m}$$ <Formula 6>

$$(NH_2(CH_2)_l)Si(OR^4)_3$$ <Formula 7> where $R^3$ and $R^4$ are each independently a $C_{1-10}$ alkyl group or a $C_{6-10}$ aryl group, l is an integer from 1 to 5, and m is an integer from 0 to 3. Preferably, $R^3$ and $R^4$ can be each independently a $C_{1-5}$ alkyl group or a phenyl group, and more preferably, a methyl group or an ethyl group.

In another embodiment, the amount of the silica precursor may be about 30 to about 99 wt. %, preferably, about 50 to about 95 wt. %, based on the total weight of the alkoxy group-containing silica precursor, the amine group-containing silica precursor and the siloxane-based polymer. The silica precursor having such amount range is suitable to preparing a silica nanocomposite. However, when required, more or less silica nanocomposite can be used to comply with the requirement. In another embodiment, the siloxane-based polymer can be polydimethylsiloxane, polydiethylsiloxane, polydimethylsiloxane-co-($C_{2-5}$)alkylmethylsiloxane, polydimethylsiloxane-co-diphenylsiloxane, polydimethylsiloxane-co-methylphenylsiloxane, polydimethylsiloxane-co-methyl(3,3,3-trifluoro)propylsiloxane, or a combination including at least one of the foregoing siloxane-based polymers. However, the siloxane-based polymer is not limited to those polymers. For example, the siloxane-based polymer can be any siloxane-based polymer that is used in the art.

In another embodiment, the alkoxy group-containing silica precursor can be tetraethyl orthosilicate, tetramethyl orthosilicate, methyl trimethoxy silane, methyl triethoxy silane, methyl tripropoxy silane, dimethyl dimethoxy silane, dimethyl diethoxy silane, diethoxy(3-glycidyloxypropyl)methyl silane, diethoxymethylphenyl silane, diethoxymethylvinyl silane, diphenyldiethoxy silane, dimethylethoxyvinyl silane, ethyltrimethoxy silane, ethyltriethoxy silane, or a combination including at least one of the foregoing alkoxy group-containing silica precursors. However, the alkoxy group-containing silica precursor is not limited to those materials, and can be any alkoxy silane compound that is used in the art.

In another embodiment, the amine group-containing silica precursor can be 3-aminopropyltriethoxysilane, 3-aminopropyl trimethoxysilane, 3-aminopropyl tripropoxysilane, or a combination including at least one of the foregoing amine group-containing silica precursors. However, the amine group-containing silica precursor is not limited to those materials and can be any amine group-containing alkoxy silane compound that is used in the art.

In another embodiment, the method can further include, before drying the wet gel, reacting the wet gel with a polymerizable monomer to form an organic coating layer on the wet gel. Specifically, the polymerizable monomer can be cross-linked with a hydroxyl group and/or amine group present in the surface of silica which forms the wet gel so that the silica surface is modified into the hydrophobic surface.

In another embodiment, the polymerizable monomer can be hexamethylenediisocyanate, diphenylmethane-4,4'-diisocyanate, diphenylmethane-2,4'-diisocyanate, diphenylmethane-2,2'-diisocyanate, tolylene-2,4-diisocyanate, tolylene-2,6-diisocyanate(TDI), polyphenylpolymethylene polyisocyanate, or a combination including at least one of the foregoing polymerizable monomers. However, the polymerizable monomer is not limited to those materials, and can be any polymerizable monomer that is used in the art.

In another embodiment, the solvent of reaction solution can be water and/or a solvent that is compatible with water and dissolves the silica precursor. Specifically, the solvent of reaction solution can be water; an alcohol such as methanol, ethanol, propanol, isopropanol, or butanol; acetone; acetonitrile; propyleneglycol; N,N-dimethyl formamide; ethylene glycol; or a combination including at least one of the foregoing solvents.

An acidic or basic catalyst may also be added to the reaction solution to facilitate hydrolysis and condensation-polymerization. Specifically, the acidic catalyst may be hydrochloric acid, citric acid, phosphoric acid, acetic acid, oxalic acid, nitric acid, sulfuric acid, ammonium fluoride or a combination comprising at least one of the foregoing catalysts; and the basic catalyst may be ammonia, ammonium hydroxide ($NH_4OH$), sodium hydroxide (NaOH), aluminum hydroxide ($Al(OH)_3$), piperidine, or a combination comprising at least one of the foregoing catalysts. Those catalysts can be used in an appropriate amount as desired.

In another embodiment, when the wet gel is dried at room temperature and in an atmospheric pressure, the obtained dried product can be a silica xerogel. Specifically, the obtained silica nanocomposite is a silica xerogel having a large surface area per unit mass. The silica xerogel prepared according to the embodiment of the present invention can have at least 5,000 times surface area per unit mass ($m^2/g$) which is measured through a nitrogen adsorption experiment when compared with a conventional silica xerogel obtained by drying at room temperature and in an atmospheric pressure, and has a sufficient mechanical flexibility to be able to endure external impacts because the siloxane-based polymer acts as a supporter. In addition, the silica xerogel obtained by drying at room temperature has a comparable surface area and pore density to a conventional silica aerogel obtained by supercritical drying. By avoiding supercritical extraction, the manufacturing costs can be reduced. In addition, because the drying can be performed at room temperature and atmospheric pressure a stable dried aerogel can be obtained.

A solvent used for drying at room temperature and at atmospheric pressure may be a $C_{1-6}$ lower alcohol (for example, methanol, ethanol, propanol, butanol, pentanol, hexanol), ethyl acetate, acetone, dichloromethane, acetonitrile, or a combination comprising at least one of the foregoing solvents.

In another embodiment of the method, the drying of the wet gel may be performed using supercritical extraction conditions. The dried product is a silica aerogel. The silica aerogel prepared using the supercritical drying method has similar surface area per unit mass to a conventional silica aerogel.

A solvent useful for the supercritical drying may be liquid carbon dioxide, a $C_{1-6}$ lower alcohol, ethyl acetate, acetone, dichloromethane, acetonitrile, or a combination comprising at least one of the foregoing solvents. For example, the solvent can be liquid carbon dioxide. In addition to the drying methods described above, freeze drying may also be used.

Monolithic molded articles can be prepared using the silica nanocomposite. The silica nanocomposite can be silica xerogel or silica aerogel. The silica nanocomposite may be molded into various shapes and monolithic molded articles having various shapes can be obtained. For example, when the silica xerogel composite is processed in a sheet form, a monolithic silica xerogel composite sheet having uniform flexibility can be obtained. Such a sheet can be used in a variety of applications including a heat insulation material and a noise shielding material.

A composite foam includes the silica nanocomposite and a blown plastic foam. The silica nanocomposite can be silica aerogel. The composite foam has low thermal conductivity, low density, and noticeably, excellent mixture dispersibility. That is, the silica nanocomposite can be very uniformly dispersed in polyurethane foam. The silica nanocomposite dispersed in the composite foam improves the heat insulating properties, mechanical properties, and thermal stability of the foam.

In another embodiment, the composite foam may include about 1 to about 30 wt. % of silica nanocomposite and about 70 to about 99 wt. % of blown plastic foam. The composite foam having such ranges is suitable for a heat insulation material.

In another embodiment, the thermal conductivity of the composite foam may be in the range from about 0.01 to about 0.4 kcal/m/hr/° C. When the conductivity of the blown plastic foam is 0.4 kcal/m/hr/° C. or less, the composite foam is suitable as a heat insulation material.

In another embodiment, the density of the composite foam may be about 35 kg/m$^3$ or less, and preferably, may be in the range from about 5 to about 35 kg/m$^3$. When the density of the blown plastic foam is about 35 kg/m$^3$ or less, that is, about 0.035 g/cm$^3$ or less, the composite foam may be suitable as a low-density material having relatively small weight with respect to a volume.

In another embodiment, the blown plastic foam can be polyurethane foam, polystyrene foam, polyvinylchloride foam, polycarbonate foam, polyetherimide foam, polyamid foam, polyester foam, polyvinylidenechloride foam, polymethylmethacrylate foam, polyurea foam, phenol-formaldehyde foam, polyisocyanurate foam, phenolics foam, bicopolymer foam or tricopolymer foam thereof, polyethylene foam, polypropylene foam, or polyolefin foam, such as ethylene copolymer foam, but is not limited thereto. For example, the blown plastic foam can be any blown plastic foam.

A method of preparing a composite foam includes: hydrolyzing a reaction solution comprising a siloxane based polymer and a silica precursor selected from an alkoxy group-containing silica precursor and an amine group-containing silica precursor to prepare a wet gel; drying the wet gel in supercritical conditions to obtain a silica aerogel; and reacting a mixture solution of the silica aerogel, an isocyanate group-containing monomer, and a premix polyol to obtain a composite foam.

In the method of preparing the composite foam, the process of preparing a silica aerogel is the same as the method of preparing the silica nanocomposite. The premix polyol used in the method of preparing the composite foam includes a polyol and an additional component. The additional component may include an amine-based catalyst, a surfactant, and/or a blowing agent. The kind and amount of the polyol and the additional component can be appropriately determined.

The polyol can be an aliphatic compound having two hydroxyl groups (—OH) in its molecule. For example, the polyol can be ether-based polyol or ester-based polyol, such as polypropylene glycol, amine terminated polyether, polytrimethylene ether glycol, polytrimethylene ether ester glycol, polytrimethylene-co-ethylene ether glycol), polytramethylene ether glycol, polyester-based polyol, or a combination of at least one of the foregoing polyols. However, the polyol is not limited to those materials and can be any polyol that is used in the art.

The blowing agent can be water. A non-water blowing agent can also be used together with water. The non-water blowing agent can be n-pentane, isopentane, cyclopentane, methylenechloride, 1,1,1,2-tetrafluoroethane, 1,1,1,3,3,-pentafluoropropane, 1,1,1,3,3,-pentafluorobutane, 1,1-dichloro-1-fluoroethane, 1-chloro-1,1-difluoroethane, chlorodifluoromethane, or a combination comprising at least one of the foregoing blowing agents. The non-water blowing agent can be any blowing agent that is used in the art. The amount of the blowing agent may be in the range from about 1- to about 150 parts by weight based on 100 parts by weight of the polyol. However, the amount of the blowing agent is not limited to the range and can be appropriately determined according to an objective in use.

According to an embodiment of the present invention, the kind and amount of an amine-based catalyst used are appropriately determined to obtain the high blowing properties, short reaction time periods, high ventilating properties, and low density deviation of the composite foam. The amine-based catalyst can be triethylamine, diethanolamine, N,N,N′,N′-tetramethylhexanediamine, N,N,N,N′-tetramethylethylenediamine, triethylenediamine, N-methylmorpholine, dimethylaminoethanol, bis(2-dimethylaminoethyl)ether, 1,8-diazabicyclo[5,4,0]-7-undecene, or a combination comprising at least one of the foregoing amine-based catalysts.

The additional component can include, in addition to the amine-based catalyst, an organometallic catalyst. The organometallic catalyst can be dibutyltindilaurate, dibutyltindiacetate, stannous octoate, dibutyltinmercaptide, dibutyltinthiocarboxylate, dibutyltinmaleate, dioctyltinmercaptide, dioctyltinthiocarboxylate, phenyl mercury, propionic acid silver, tin octenic acid, or a combination comprising at least one of the foregoing organometallic catalysts. The amine-based catalyst can be a tertiary amine. The base properties and structure of the amine-based catalyst may determine reactivity of the amine-based catalyst. The amount of the entire catalyst including the amine-based catalyst and the organometallic catalyst may be in the range from about 0.1 to about 50 parts by weight based on 100 parts by weight of the polyol. However, the amount of the entire catalyst including the amine-based catalyst and the organometallic catalyst can be appropriately determined according to an objective in use.

The surfactant can be a silicon-based surfactant and/or non-ionic polyether surfactant. The silicon-based surfactant can be, for example, a polysiloxane/polyether copolymer. Specifically, examples of the silicon-based surfactant can include B-8462 and B-8404 (Tegostab, Goldschmidt Chemical Corp.); L-6900 and L-6910 (Niax, GE Silicones); DC-198 (Dow corning) and DC-5043 (Dow Corning). The non-ionic polyether surfactant can be an ethylene oxide/propylene oxide block copolymer and/or ethylene oxide/buthylene oxide block copolymer. The surfactant reduces a surface tension of the mixture solution so that compatibility of additional components is improved and the obtained foam has a uniform size. Also, the surfactant controls the cell structure of the composite foam such that the composite foam is stable. The amount of the surfactant may be in the range from about 0.1 to about 50 parts by weight based on 100 parts by weight of the polyol. However, the amount of the surfactant may be appropriately determined according to an objective in use.

The mixture solution can further include a blowing agent stabilizer, a cell controller, a filler, a pigment, a dye, a flame retardant, a hydrolysis inhibitor, an electrostatics preventing agent, a colorant, an antibiotic, an antifungal agent and/or a bacteriostatic agent, while properties of the composite foam are not changed.

In the mixture solution, the amount of the silica aerogel may be in the range from about 1 to about 30 parts by weight based on 100 parts by weight of the polyol. However, the amount of the silica aerogel may be appropriately determined according to an objective in use.

The isocyanate group-containing monomer reacts with a polyol to form polyuretane. The isocyanate group-containing monomer can be methylene diphenyl diisocyanate (MDI), polymeric methylene diphenyl diisocyanate, toluene diisocyanate (TDI), hexamethylene diisocyanate, trimethyl hexamethylene diisocyanate, phenylene diisocyanate, dimethyl diphenyl diisocyanate, tetra methylene diisocyanate, iso holon diisocyanate, naphthalene diisocyanate, triphenyl methane triisocyanate, or a combination comprising at least one of the foregoing monomers. However, the isocyanate group-containing monomer is not limited to those materials, and can be any isocyanate group-containing monomer that is used in the art. The amount of the isocyanate group-containing monomer may be in the range from about 101 to about 150 parts by weight based on 100 parts by weight of the polyol. However, the amount of the isocyanate group-containing monomer may be appropriately determined according to an objective in use.

In another embodiment, to form the composite foam, based on 100 parts by weight of the polyol, about 0.1 to about 50 parts by weight of the entire catalyst, about 0.1 to about 50 parts by weight of the surfactant, and about 1 to about 150 parts by weight of the blowing agent can be mixed to form a premix polyol; and about 1 to about 30 parts by weight of the silica aerogel can be added to the premix polyol and then mixed together; about 101 to about 150 parts by weight of the isocyanate group-containing monomer can be added to the obtained mixture of the premix polyol and the silica aerogel and then mixed together; and the resultant mixture is blown.

A composite heat insulation material includes the composite foam. Since the heat insulation material includes the composite foam, excellent heat insulation properties based on low thermal conductivity and light-weightiness due to low density can be securely obtained. The heat insulation material can be used in a refrigerator or an air conditioner.

The present invention will now be described in greater detail with reference to the following examples. The following examples are for illustrative purposes only and are not intended to limit the scope of the invention.

Preparation of Silica Nanocomposite

Example 1

Silica Xerogel

Silica Nanocomposite Coated with an Organic Layer 2.8 grams (g) of methyltrimethoxysilane, 0.92 g of aminopropyltriethoxysilane, 1 g of polydimethylsiloxane (number average molecular weight=550, purchased from Aldrich, poly(dimethyl siloxane) hydroxy terminated), and 3.5 g of acetonitrile were mixed to prepare a solution A. 3.5 g of acetonitrile and 1.5 g of water were mixed to prepare a solution B. Then, solution A and solution B were rapidly mixed and stirred for about 1 minute to prepare a silica sol. The silica sol was poured into a Petri dish and left for about 24 hours to allow gelling. After gelling, the resulting product was aged for 48 hours, while exchanging the acetonitrile with fresh acetonitrile every 12 hours.

8 g of hexamethylenediisocyanate was then added to 15.6 g of acetonitrile. The gelled material was added to the solution and then maintained at equilibrium for 24 hours with shaking at intervals. Subsequently, the gelled material was placed into fresh acetonitrile and heated in an oven at 70° C. for 72 hours. After cooling to room temperature, the gel was placed in a fresh ethanol solution and the solvent was substituted with fresh solvent every 12 hours.

Then, the gel was transferred to a Petri dish and dried in a vacuum oven at 30° C. for 48 hours to obtain a silica xerogel.

Example 2

Silica Xerogel

Silica Nanocomposite Coated with an Organic Layer

A silica xerogel was prepared in the same manner as in Example 1, except that 2 g of polydimethylsiloxane (number average molecular weight=550, purchased from Aldrich, poly(dimethyl siloxane) hydroxy terminated) was used.

Example 3

Silica Aerogel

Silica Nanocomposite Coated with an Organic Layer

A silica aerogel was prepared in the same manner as in Example 1, except that in the drying process, the solvent-exchanged gel was placed in 5.1 mega pascals (MPa) of carbon dioxide at 18° C. to substitute ethanol in the gel with liquid carbon dioxide for 2 to 3 hours, and then a supercritical drying was performed at a temperature of 40° C. at 8.1 MPa for about 24 hours.

Example 4

Silica Xerogel

Silica Nanocomposite not Coated with an Organic Layer 2.8 grams (g) of methyltrimethoxysilane, 0.92 g of aminopropyltriethoxysilane, 1 g of polydimethylsiloxane (number average molecular weight=550, purchased from Aldrich, poly(dimethyl siloxane) hydroxy terminated), and 3.5 g of acetonitrile were mixed to prepare a solution A. 3.5 g of acetonitrile and 1.5 g of water were mixed to prepare a solution B. Then, solution A and solution B were rapidly mixed and stirred for about 1 minute to prepare a silica sol. The silica sol was poured into a Petri dish and left for about 24 hours to allow gelling. After the gelling, the gel was placed in a fresh ethanol solution and the solvent was substituted with fresh solvent every 12 hours.

Then, the gel was transferred to a Petri dish and dried in a vacuum oven at 30° C. for 48 hours to obtain a silica xerogel.

Example 5

Silica Aerogel

Silica Nanocomposite not Coated with an Organic Layer

A silica aerogel was prepared in the same manner as in Example 4, except that in the drying process, the solvent-exchanged gel was placed in 5.1 mega pascals (MPa) of carbon dioxide at 18° C. to substitute ethanol in the gel with liquid carbon dioxide for 2 to 3 hours, and then a supercritical drying was performed at a temperature of 40° C. at 8.1 MPa for about 24 hours.

Example 6

Composite Foam

Using an Aerogel Silica Nanocomposite not Coated with an Organic Layer 5 parts by weight of the silica aerogel prepared according to Example 5 based on 100 parts by weight of polyol was added to a premix polyol. The premix polyol included 5 parts by weight of amine catalyst (PolyCat (PC) series of Air Product Co.), 10 parts by weight of a silicon-based surfactant (surfactant B series of Gold Smith Co.) and 40 parts by weight of a blowing agent (cyclopentane), based on 100 parts by weight of polyol(polyether polyol, Basf Co.). Then, they were mixed and stirred at 1000 rpm for 10 seconds. Then, 150 parts by weight of methylene diphenyl diisocyanate based on 100 parts by weight of the premix polyol was added to the obtained mixture at 2000 rpm for 10 seconds. The resultant product was poured into a mold having a size of 15 cm×15 cm×2 cm to prepare a composite foam.

After a molding time period, a rigid composite foam was obtained. In the composite foam, the silica aerogel was present in an amount of 3 wt. % and polyurethane foam was present in an amount of 97 wt. %.

Example 7

Composite Foam

Using an Aerogel Silica Nanocomposite Coated with an Organic Layer

A composite foam was prepared in the same manner as in Example 6, except that the silica aerogel prepared according to Example 3 was used.

Comparative Example 1

Silica Xerogel

When an Organic Coating Layer is Formed on a Conventional Silica Xerogel which does not Include Poly Siloxane 2.8 grams (g) of methyltrimethoxysilane, 0.92 g of aminopropyltriethoxysilane, and 3.5 g of acetonitrile were mixed to prepare a solution A. 3.5 g of acetonitrile and 1.5 g of water were mixed to prepare a solution B. Then, solution A and solution B were rapidly mixed and stirred for about 1 minute to prepare a silica sol. The silica sol was poured into a Petri dish and left for about 24 hours to allow gelling.

After gelling, the resulting product was aged for 48 hours, while exchanging the acetonitrile with fresh acetonitrile every 12 hours.

8 g of hexamethylenediisocyanate was then added to 15.6 g of acetonitrile. The gelled material was added to the solution and then maintained at equilibrium for 24 hours with shaking at intervals. Subsequently, the gelled material was placed into fresh acetonitrile and heated in an oven at 70° C. for 72 hours.

After cooling to room temperature, the gel was placed in a fresh ethanol solution and the solvent was substituted with fresh solvent every 12 hours.

Then, the gel was transferred to a Petri dish and dried in a vacuum oven at 30° C. for 48 hours to obtain a silica xerogel.

Comparative Example 2

Silica Aerogel

Commercially Available Aerogel

A commercially available silica aerogel (Cabot Company, nanogel) prepared using a supercritical drying method was used.

Comparative Example 3

Silica Aerogel

Conventional Silica Aerogel which does not Include Poly Siloxane 2.8 grams (g) of methyltrimethoxysilane, 0.92 g of aminopropyltriethoxysilane, and 3.5 g of acetonitrile were mixed to prepare a solution A. 3.5 g of acetonitrile and 1.5 g of water were mixed to prepare a solution B. Then, solution A and solution B were rapidly mixed and stirred for about 1 minute to prepare a silica sol. The silica sol was poured into a Petri dish and left for about 24 hours to allow gelling.

Then, the gel was placed in a fresh ethanol solution and the solvent was substituted with fresh solvent every 12 hours.

In the drying process, the solvent-exchanged gel was placed in 5.1 mega pascals (MPa) of carbon dioxide at 18° C. to substitute ethanol in the gel with liquid carbon dioxide for 2 to 3 hours, and then a supercritical drying was performed at a temperature of 40° C. at 8.1 MPa for about 24 hours to obtain a silica aerogel.

Comparative Example 4

Polyurethane Foam

Polyurethane foam was prepared in the same manner as in Example 6, except that silica aerogel was not used.

Comparative Example 5

Composite Foam

A composite foam was prepared in the same manner as in Example 6, except that 5 parts by weight of the silica aerogel prepared according to Comparative Example 3 was used instead of 5 parts by weight of the silica aerogel prepared according to Example 5.

Comparative Example 6

Composite Foam

A composite foam was prepared in the same manner as in Example 6, except that 5 parts by weight of the silica aerogel Cabot company, nanogel) used in Comparative Example 2 was used instead of 5 parts by weight of the silica aerogel prepared according to Example 5.

Evaluation Example 1

Optical Image Identification

FIGS. 1A through 1D are photographic images of the silica xerogel of Example 1 and the silica xerogel of Comparative Example 1 observed over time.

Figure 1A:
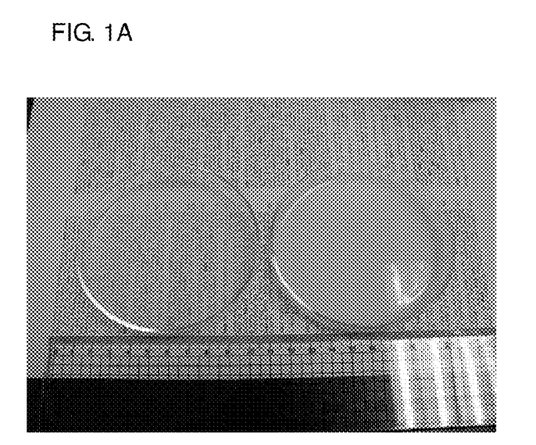
FIG. 1A is an optical image of a silica xerogel prepared according to Example 1 (right Petri dish) and Comparative Example 1 (left Petri dish)
Figure 1B:
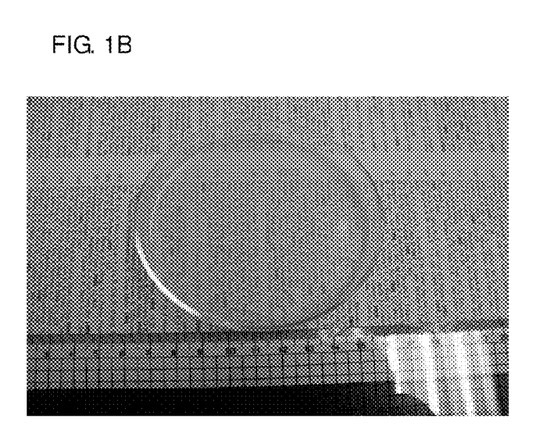
FIGS. 1B-1C are optical images of a silica xerogel prepared according to Example 1 and a silica xerogel prepared according to Comparative Example 1 observed over time.
Figure 1C:
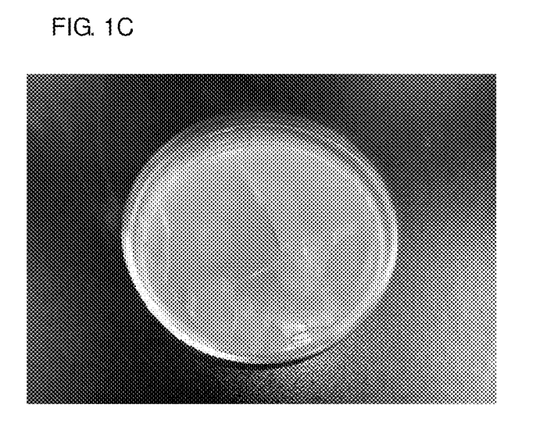
Figure 1D:
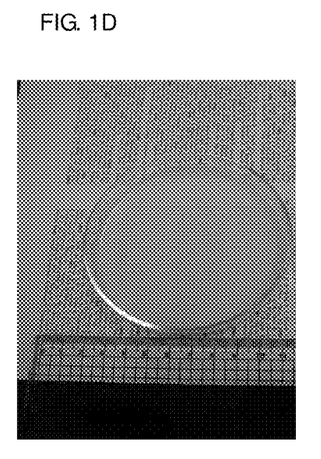
FIG. 1D is an optical image of a silica xerogel prepared according to Example 1 after a predetermined time period.

The left image in FIG. 1A represents the sample prepared according to Comparative Example 1 and the right image represents the sample prepared according to Example 1. FIGS. 1B and 1C are photographic images of Comparative Example 1 taken after a period of time after the image of FIG. 1A was taken and FIG. 1D is a photographic image of Example 1 taken after a period of time after the image of FIG. 1A was taken.

As can be seen from these images, the silica xerogel of Comparative Example 1 hardened over time and cracks were formed therein, while the silica xerogel having a siloxane-based polymer of Example 1 maintained its original state.

Evaluation Example 2

Measurement of Infrared (IR) Spectrum

Figure 2:
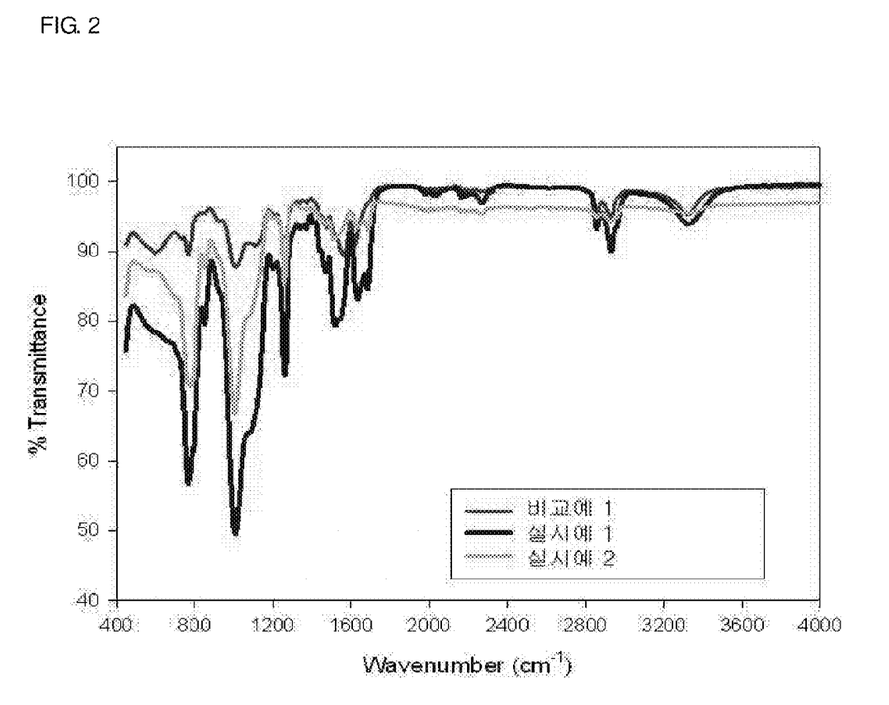
FIG. 2 is a graph illustrating IR spectra of the silica xerogels prepared according to Examples 1 and 2 and the silica xerogel prepared according to Comparative Example 1.

FIG. 2 is a graph illustrating IR spectra of the silica xerogel of Examples 1 and 2 and Comparative Example 1.

Referring to FIG. 2, Examples 1 and 2 showed characteristic peaks at 1630 to 1680 $cm^{-1}$. This indicates that due to the addition of polysiloxane, a hydroxyl group of polysiloxane, a hydroxyl group of a silanol group and an amine group present in the silica surface react with a monomeric isocyanate to form —CONH—, resulting in a stretch mode of C=O at 1630 to 1680 $cm^{-1}$. In other words, the presence of polysiloxane produces a stronger Si—O—Si asymmetric stretch mode at 1100 $cm^{-1}$ than Comparative Example 1 and enables a urethane and urea layer to be thickened (1630 to 1680 $cm^{-1}$, C=O stretch mode).

Evaluation Example 3

Nitrogen Adsorption Experiment

Gels of Examples 1 and 3 and Comparative Examples 1 and 2 were subjected to a nitrogen adsorption experiment using an ASAP 2000 surface area analyzer (Micromeritics Co.). The results are shown in FIGS. 3A through 3D.

Figure 3A:
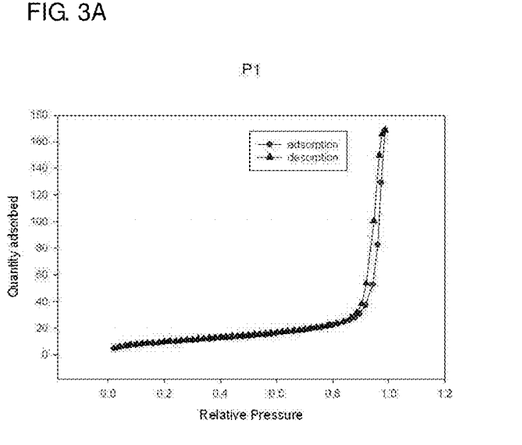
FIG. 3A is a graph illustrating a nitrogen adsorption-desorption of the silica xerogel prepared according to Example 1.
Figure 3B:
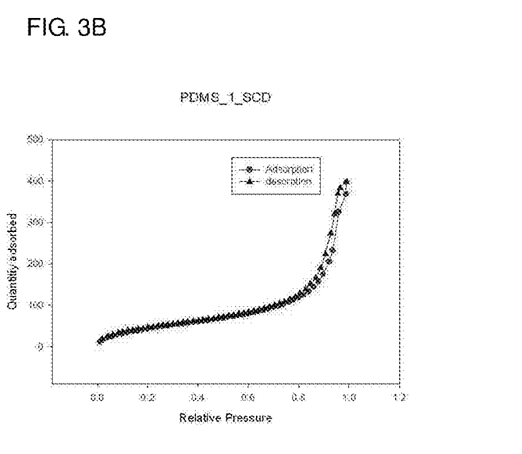
FIG. 3B is a graph illustrating a nitrogen adsorption-desorption of the silica aerogel prepared according to Example 3.
Figure 3C:
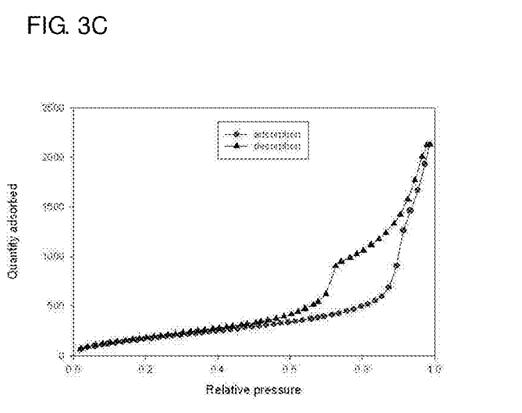
FIG. 3C is a graph illustrating a nitrogen adsorption-desorption of the silica aerogel prepared according to Comparative Example 2.
Figure 3D:
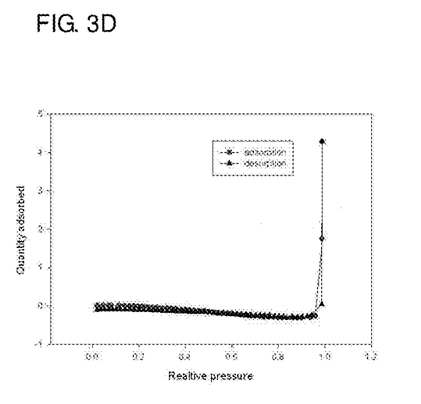
FIG. 3D is a graph illustrating a nitrogen adsorption-desorption of the silica xerogel prepared according to Comparative Example 1.

Referring to FIG. 3D, the xerogel of Comparative Example 1 showed an almost no increase in the quantity of nitrogen adsorbed with respect to an increase in pressure. This indicates that most of the pores have been collapsed. On the other hand, Examples 1 and 2 have absorption-desorption curves (FIGS. 3A and 3B) similar to that of Comparative Example 2 (FIG. 3C). This indicates that a silica nanocomposite according to an embodiment of the present invention has more pores than the silica xerogel prepared according to Comparative Example 1 and 2, and a significant number of pores are present in the inside of the silica nanocomposite.

Evaluation Example 4

Surface Area Measurement

Based on the results obtained from the nitrogen adsorption experiment, the surface area per unit mass and the average pore diameter of the gels of Examples 1 and 3 and Comparative Examples 1 and 2 were calculated and the results are shown in Table 1 as follows.

TABLE 1

| | Surface area per unit mass [m²/g] | Average pore diameter (nm) |
|---|---|---|
| Example 1 (xerogel) | 36.2 | 28.8 |
| Example 3 (aerogel) | 175.3 | 14.3 |
| Comparative Example 1 (xerogel) | 0.0072 | — |
| Comparative Example 2 (aerogel) | 729 | 18.1 |

Referring to Table 1, the silica xerogel prepared according to Example 1 in which the siloxane-based polymer was used has at least 5000 times greater surface area per unit mass than the silica xerogel of Comparative Example 1 in which the siloxane-based polymer was not used. The silica xerogel prepared according to Example 1 has lower surface areas per unit mass than the conventional silica aerogel of Comparative Example 2, but has surface areas in a comparative range. Thus, a high temperature and a high pressure for the supercritical drying are not required and the processing costs can be substantially reduced.

Evaluation Example 5

SEM Measurement of Silica Xerogel

FE-SEM (Field Emission Scanning Electron Microscope) images of the gels prepared according to Comparative Examples 1 and 2 and Examples 1, 2, and 5 are shown in FIGS. 4A through 4E, respectively. A Model S-4700 (Hitachi) was used in this experiment.

Figure 4A:
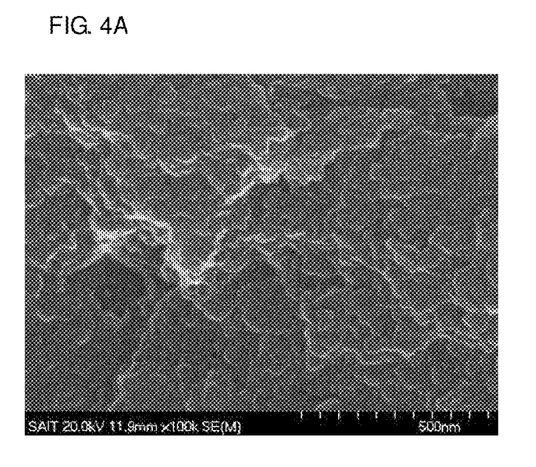
FIG. 4A is a scanning electron microscopic (SEM) image of the silica xerogel prepared according to Comparative Example 1.
Figure 4B:
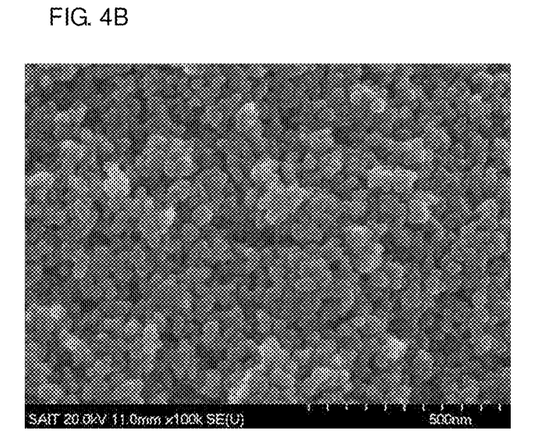
FIG. 4B is a SEM image of the silica aerogel prepared according to Comparative Example 2.
Figure 4C:
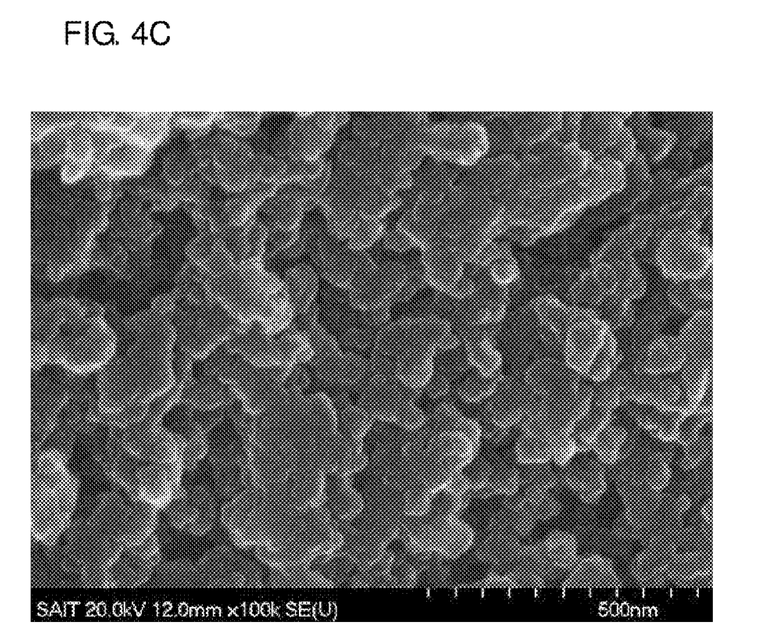
FIG. 4C is a SEM image of the silica xerogel prepared according to Example 1.
Figure 4D:
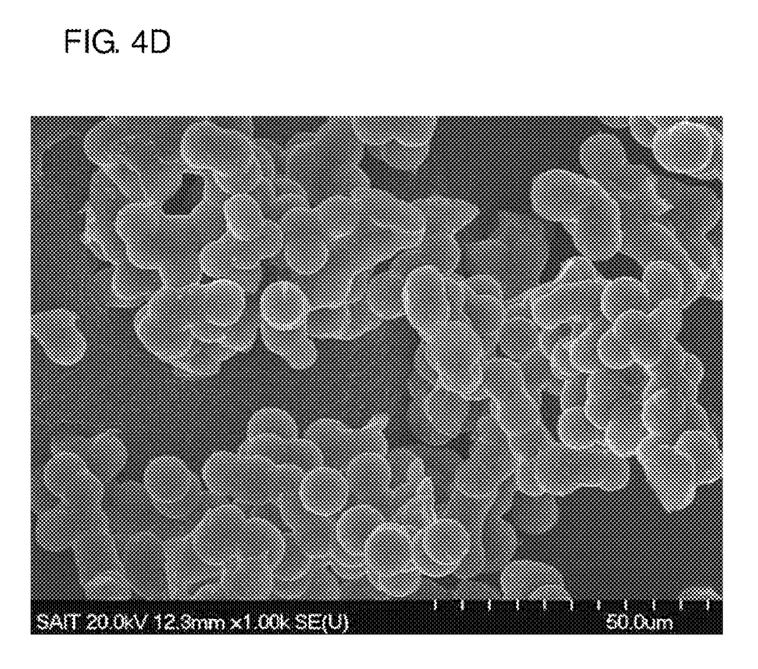
FIG. 4D is a SEM image of the silica xerogel prepared according to Example 2.

Referring to FIG. 4A, the silica xerogel of Comparative Example 1 rarely has pores since silica particles of the wet gel were aggregated during drying. In FIG. 4B, which shows the image of the conventional silica aerogel (Comparative Example 2), there are distinct pores between silica particles.

Figure 4E:
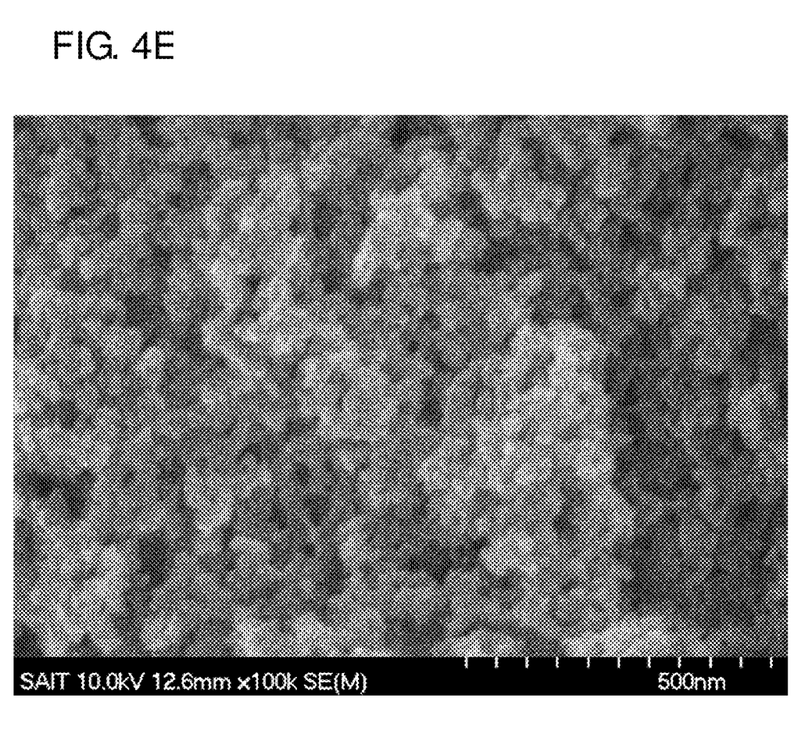
FIG. 4E is a SEM image of the silica aerogel prepared according to Example 5.

The silica xerogels prepared according to Examples 1 and 2 (FIGS. 4C and 4D) have more pores than the xerogel prepared according to Comparative Example 1. Referring to FIG. 4E, there are many pores in the silica aerogel to which a polysiloxane polymer is bonded prepared according to Example 5.

Evaluation Example 6

Properties of Foam

The thermal conductivity, density, and mixture dispersibility of the foams prepared according to Examples 6 and 7 and Comparative Examples 4-6 were measured. The results are shown in Table 2.

The thermal conductivity of the foams was measured using a heat flow technique. Specifically, Netzsch HFM 436 series thermal conductivity meter was used such that the amount of heat passing through a foam between two heated planes of the thermal conductivity meter was measured using a compensated heat. This experiment was repeated five to six times to measure thermal conductivity and the average value thereof was obtained.

Density of each of the foams was measured using the volume and mass of the foam.

The mixture dispersibility of each foam was identified using the morphology shown in the field emission scanning electron microscopic (FE-SEM) image. The used device was Model S-4700 purchased from Hitachi Co. When the mixture dispersibility is excellent, phase separation does not occur when the cells of the foam are formed and a plurality of uniform cells can be obtained and thus, a heat insulation effect is improved. The mixture dispersibility was evaluated using the terminologies 'good' and 'bad':

good: the FE-SEM image shows a uniform foam because no phase separation occurs; and bad: the FE-SEM image shows a non-uniform foam because phase separation occurs.

TABLE 2

| | Thermal Conductivity [kcal/m/hr/° C.] | Foam Density (kg/m³) | Mixture Dispersibility |
|---|---|---|---|
| Comparative Example 4 | 0.01540 | 29.92 | good |
| Comparative Example 5 | 0.01540 | 28.65 | bad |
| Comparative Example 6 | 0.01641 | 26.9 | bad |
| Example 6 | 0.0157 | 31.82 | good |
| Example 7 | 0.0155 | 31.77 | good |

As shown in Table 2, the composite foam prepared according to Examples 6 and 7 has a thermal conductivity lower than that of Comparative Example 6 wherein a commercially available aerogel was used and similar to that of Comparative Example 4 wherein the polyurethane foam was used. Foam density of the composite foams represented by Examples is similar to those prepared according to Comparative Examples. The composite foams represented by Examples have enhanced mixture dispersibility than those prepared according to Comparative Examples 5 and 6.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A silica nanocomposite comprising: silica; and a siloxane-based polymer covalently bonded to the silica, wherein at least one kind of an organic coating layer is additionally formed on a surface of the silica nanocomposite; the organic coating layer being selected from a polyurethane-based organic coating layer and a polyurea-based organic coating layer.

2. The silica nanocomposite of claim 1, wherein the siloxane-based polymer covalently bonded to the silica has a repeating unit represented by Formula 1:

—[Si(R$_1$)(R$_2$)O—]$_k$—   <Formula 1> where R$_1$ and R$_2$ are each independently a C$_1$-C$_{10}$ alkyl group or a C$_6$-C$_{10}$ aryl group, and k is an integer from 2 to 1000.

3. The silica nanocomposite of claim 1, wherein the silica comprises one or more repeating unit selected from the repeating units represented by Formulae 2-4:

—[SiO$_2$—]$_a$—   <Formula 2>

—[Si(R$^3$)O$_{3/2}$—]$_b$—   <Formula 3>

—[Si((CH$_2$)$_l$NH$_2$)O$_{3/2}$—]$_c$—   <Formula 4> where R$^3$ is a C$_1$-C$_{10}$ alkyl group or a C$_6$-C$_{10}$ aryl group, a, b and c are each independently an integer from 1 to 100, and l is an integer from 1 to 5.

4. The silica nanocomposite of claim 1, wherein the silica nanocomposite is a silica xerogel or a silica aerogel.

5. A monolithic molded article prepared using the silica nanocomposite of claim 4.

6. A composite foam comprising:
   a silica nanocomposite of claim 1; wherein the silica nanocomposite comprises of a silica aerogel or a silica xerogel; and
   a blown plastic foam.

7. The composite foam of claim 6, wherein the composite foam comprises about 1 to about 30 wt. % of a silica nanocomposite and about 70 to about 99 wt. % of a blown plastic foam.

8. The composite foam of claim 6, wherein the blown plastic foam comprises at least one foam selected from the group consisting of polyurethane foam, polystyrene foam, polyvinylchloride foam, polycarbonate foam, polyetherimide foam, polyamid foam, polyester foam, polyvinylidenechloride foam, polymethylmethacrylate foam, polyurea foam, phenol-formaldehyde foam, polyisocyanurate foam, phenolics foam, polyethylene foam, and polypropylene foam.

9. A composite heat insulation material comprising the composite foam of claim 6.

* * * * *